June 20, 1967 C. H. LOCH 3,327,104
RUNWAY LIGHT WITH SHALLOW OPTICAL SYSTEM
Filed July 19, 1965 2 Sheets-Sheet 1

FIG.I.

WITNESSES

INVENTOR
Charles H. Loch
BY
ATTORNEY

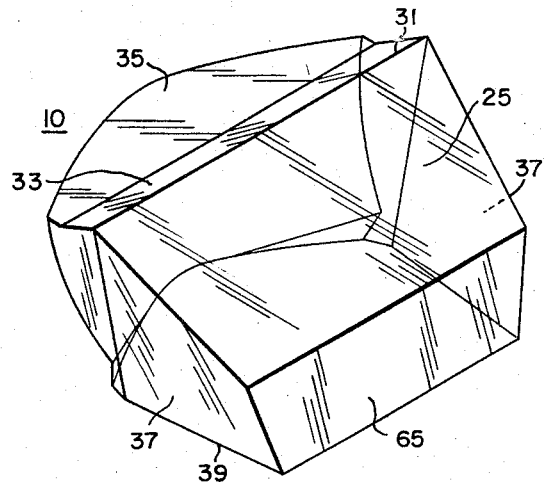
FIG. 2.
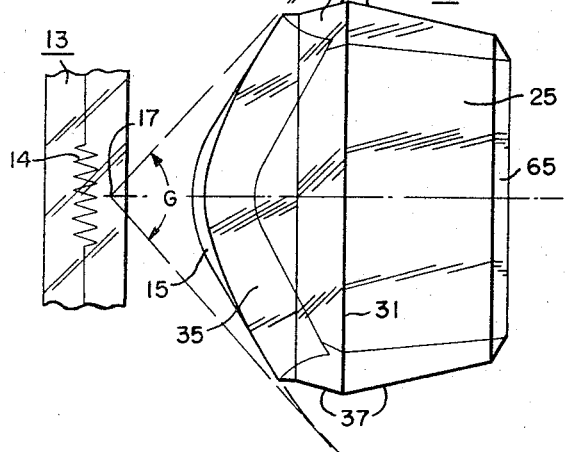
FIG. 4.
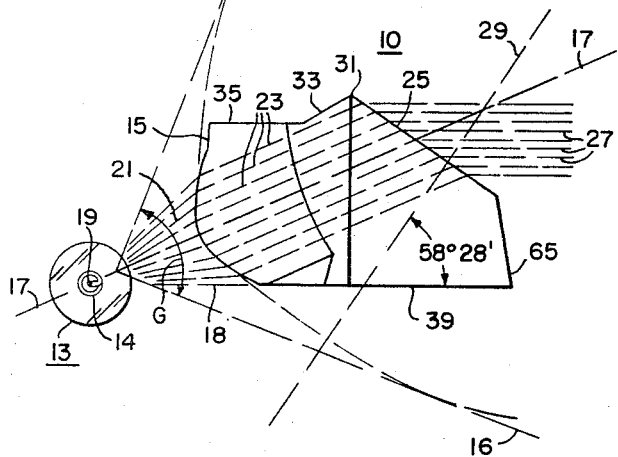
FIG. 3.
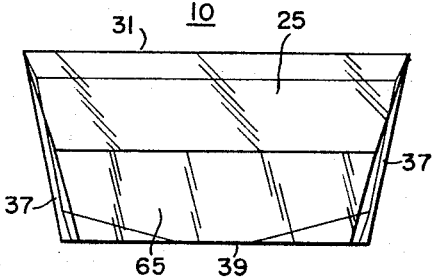
FIG. 5.

United States Patent Office 3,327,104
Patented June 20, 1967

3,327,104
RUNWAY LIGHT WITH SHALLOW OPTICAL SYSTEM
Charles H. Loch, Berea, Ohio, assignor to Westinghouse Electric Corporation, Pittsburgh, Pa., a corporation of Pennsylvania
Filed July 19, 1965, Ser. No. 472,951
15 Claims. (Cl. 240—1.2)

This invention relates generally to refracting lenses, and more particularly to such a lens as employed in a shallow optical system.

Currently airport runway lights are installed along the center of the runway embedded almost flush with the surface thereof. To prevent weakening the runway, the lighting units are preferably designed to be as shallow vertically as possible. Problems are encountered in mounting and sealing the lens within the housing of the runway unit. Further, the units get very hot from the light source therein because the housing has only one exposed surface from which to radiate the heat. It is also desirable that the lens be mechanically cushioned with respect to the housing.

It is therefore an object of this invention to provide an optical system in a runway lighting unit which emits a much shallower horizontal beam than heretofore possible.

It is yet another object of this invention to provide a runway lighting unit housing including a refracting lens which can be mounted and sealed therein in an improved manner.

It is a further object of this invention to provide an optical system having a refracting lens provided with optical surfaces which can be more readily manufactured.

It is another object of this invention to provide an optical system having a refracting lens which can be more readily analyzed optically.

It it an additional object of this invention to provide an optical system having a refractor lens which is more easily removed from the mold during manufacture.

Briefly, these and other objects are achieved by providing a shallow, horizontally disposed refractor lens mounted within a housing almost flush with the surface of the runway. The interior light entrance face of the lens has a double convex contour which focuses at a point spaced laterally from and slightly below the entrance face. The exterior light exit face, which is oppositely disposed on the lens from the entrance face, has a flat contour sloping up and towards the center of the lens. Diverging light rays, from a light source placed at the focal point of the entrance face, are refracted into parallel rays by the contour of the entrance surface. These parallel rays travel through the lens and are refracted into a generally horizontal beam by the flat light exit face. The refracting properties of the lens and the position of the focal point permit the optical system to be shallow vertically. The housing of the unit has a correspondingly shallow configuration. The flat exit face is easily ground and polished during manufacture and easily cleaned after being installed in the runway unit. The double convex light entrance face is a surface of revolution which expedites the making of the mold used to manufacture the lens. The sides of the lens taper from the center towards each end, to facilitate removing the lens from the mold during manufacture. The lens is provided with mounting surfaces which are flush with the lens and therefore readily provided during manufacturing process. The mounting surfaces are on the periphery of the lens and do not interfere with the optical system.

For a better understanding of the invention reference should be had to the accompanying drawings, in which:

FIG. 2 shows a perspective view of the lens per se;

FIG. 3 shows a side elevational view of the lens and light source showing the light refraction pattern;

FIG. 4 shows a diagrammatic top plan view of the lens and light source; and

FIG. 5 shows a front elevational view of the lens.

Figure 1:
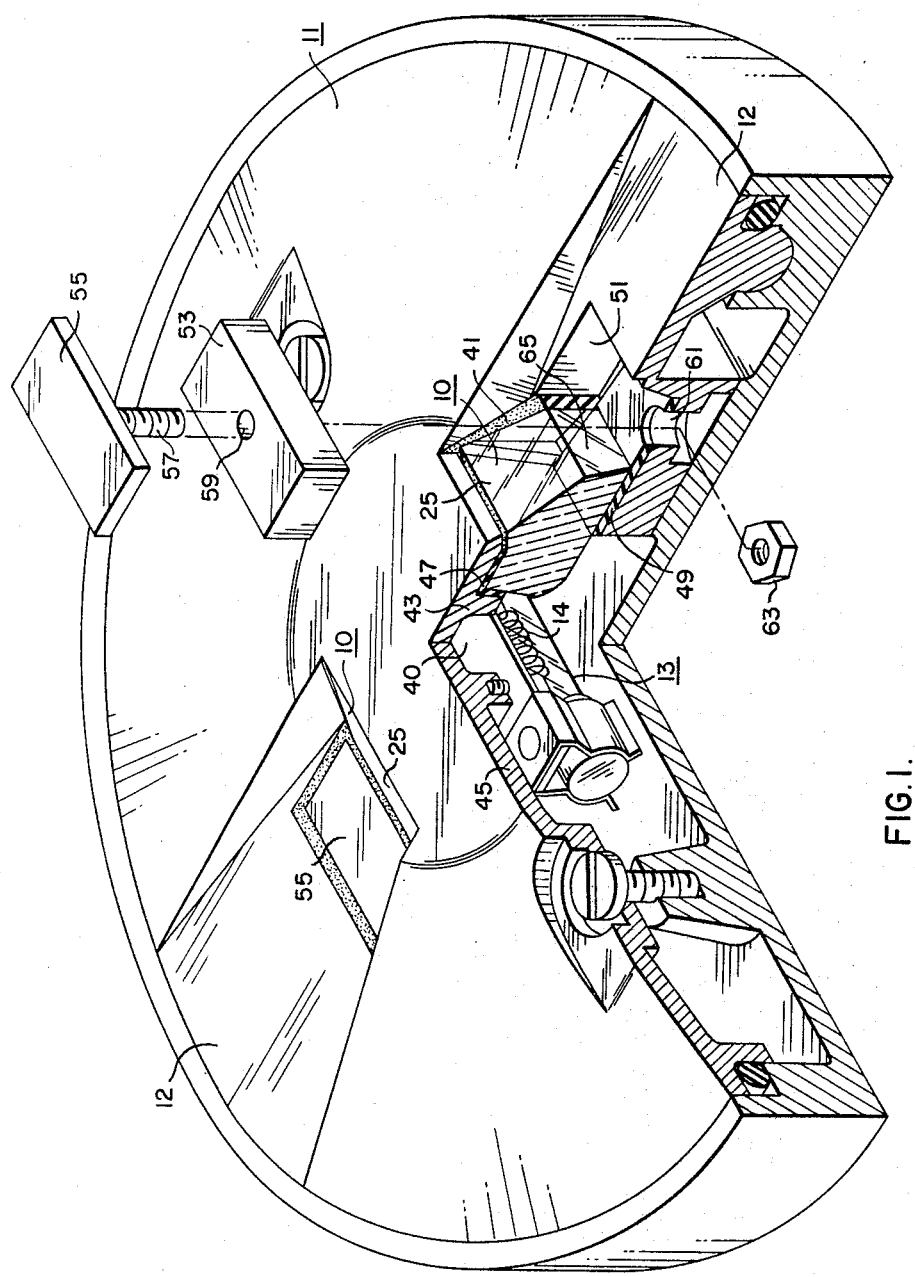
FIGURE 1 shows a partially cut away perspective view of a runway lighting unit with the novel optical system mounted therein.

Referring now to FIG. 1 there are shown two refracting lenses 10 mounted within a housing 11 which has two radially extending light exit troughs 12. A slightly elongated light source 13 having a filament 14 is positioned directly behind and slightly below the lenses 10. For more information concerning the housing 11 construction and the light source 13 mounting, reference may be had to a copending application Ser. No. 92,049, filed Feb. 27, 1961, now abandoned, a continuation thereof now issued as Patent No. 3,250,907, and both assigned to the present assignee. FIG. 2 shows a single complete refracting lens 10 separate from the housing 11.

The operation of the optical system is clearly illustrated in FIG. 3. A light entrance face 15 is shown rearwardly and downwardly disposed at the end of the lens 10 which faces the light source 13. This entrance face 15 is a portion of a hyperboloid of revolution about an axis 17, which in the preferred embodiment is angularly displaced 24°20' from the horizontal runs upwardly towards the center of the lens 10. The axis of revolution 17 is contained in a vertical plane which divides the lens from front to rear into generally equal halves. The hyperbolic entrance face 15 has asymptotes 16 and a focal point 19 located rearwardly laterally from and slightly below the lens 10. The focal point 19 is on the axis of revolution 17 a short distance from the lens 10. The filament 14 of the light source 13 is positioned proximate the focal point 19. Diverging light rays 21 from the light source 13 strike the light entrance face 15 and are refracted into the lens 10 as generally parallel light rays 23. The parallel light rays 23 proceed through the lens 10 in parallel relation with the axis of revolution 17. The parallel light rays 23 strike a flat light exit face 25, and are refracted downwards out of the lens into generally horizontal light rays 27. The flat exit face 25 slopes upwardly and towards the center of the lens 10. In order to obtain the horizontal rays 27, the perpendicular 29 to the exit face 25 must be angularly displaced further from the horizontal 18 than the axis of revolution 17. In this particular design, the perpendicular 29 is displaced 58°28' from the horizontal 18. The shallow positioning of the lens 10 and the light source 13 permit the shallow configuration of the housing 11.

The refractive analysis of a hyperbola of revolution combined with a flat surface is summarized as follows. The hyperbolic entrance face 15 functions merely to refract diverging light rays 21 into parallel light rays 23. This is accomplished by placing the filament 14 of the light source 13 proximate the focal point 19 of the entrance face 15. The angle G between the asymptotes is determined solely by the refractive index (RI) of the lens. That is: $CoT(1/2 \text{ angle } G) = \sqrt{RI^2 - 1}$. The curve of the hyperbolic face 15 is determined by the desired focal length (FL) in accordance with the following equation in an XY coordinate system:

$$\left[ X + \frac{(RI)(FL)}{RI+1} \right]^2 - \frac{y^2}{(RI)^2 - 1} = \frac{(FL)^2}{(RI+1)^2}$$

where the focal point 19 of the lens is at the origin and the X axis is the axis of revolution 17.

For example, in the preferred embodiment the lens is glass and has a refractive index of 1.486 and the focal length is 0.62 inch; the angle G is 95°26′ and the hyperbolic curve is expressed by the equation:

$$16.1|x+.373|^2 - 13.2y^2 = 1$$

The flat exit face 25 refracts these parallel rays 23 into horizontal rays 27. The slope of the exit face 25 required to accomplish this refraction may be calculated by using Snell's Law of Refraction.

The lens 10 is traversed by an inverted V-shaped top ridge 31. The top ridge 31 extends the exit face 25 upwards without increasing the height of the entire lens 10. The forward facing surface of the top ridge 31 is coplanar and integral with the exit face, and forms the upper portion of the exit face 25. The rearward facing surface 33 of the top ridge has a downward slope towards the rear which is parallel to the axis of revolution 17 of the entrance face 15. The rear surface 33 levels off into a horizontal plateau 35 which terminates at the rearward end of the lens 10.

Although in the preferred embodiment the lens is made of glass, it is to be understood that any transparent material having suitable mechanical and thermal properties may be employed.

The lens 10 is provided with numerous features which expedite its manufacture. The lens 10 is formed by a two piece mold having a front and a rear half. The resulting mold burr is around the top, sides 37, and bottom 39 of the lens at the middle thereof and not across the entrance face 15 or exit face 25. To aid in removing the mold from the lens 10, the sides 37 of the lens 10 are tapered from the middle towards its ends as clearly shown in the top view FIG. 4. The downward rearward slope 33 of the top ridge 31 and the downward frontward slope of the light exit face 25 supplement the taper effect in mold removal process. The rear half of the mold, which forms the entrance face 15, is more readily fashioned because the entrance face is a surface of revolution. The exit face 25 is flat and can easily be ground and polished. The light transmission efficiency is increased substantially due to the polish finish. The depth to which the exit face 25 is ground in order to obtain a polished surface is not critical. In the specific example, the angle of the exit face 25 is maintained very closely at 31°32′.

The lens 10 is mounted as shown in FIG. 1, and as indicated in the drawing, more than one lens 10 may be used in combination with the light source 13. The lens 10 is inserted into the housing cavity 40 through housing window 41. The entrance face 15 of the lens 10 is inserted first. The lens 10 is slid rearward until the top edge of the entrance face 15 is pushed against a holding ridge 43 which extends downwards from the housing ceiling 45. The horizontal plateau 35 is adjacent to the housing ceiling 45 and the top ridge 31 extends slightly above the ceiling surface into the housing window 41. A right angle shaped pad 47 is provided around the upper rear corner of the lens 10 to prevent contact between the lens 10 and the housing 11. A bottom pad 49 is provided under the lens 10.

A rubber sealant is provided all around the lens 10 to seal the housing 11 against dirt and moisture, and to cushion the lens against thermal expansion effects. The lens 10 is substantially smaller than the housing cavity 40 to allow space for the sealant. The sealant is placed in the housing cavity 40 after the lens 10. The sides 37 of the lens 10 are not vertical, but slope inwards towards the bottom as shown in the front view FIG. 5. This slope aids in distributing the sealant over the sides 37 of the lens 10. The lower portion of the housing window extends to form an exposed gap 51 at the inwardly extending end of trough 12. A flexible rubber block 53 is inserted into the gap to hold the lens in place. A clamping or pressing plate 55 with a bottom extended threaded stem 57 is placed on top of the rubber block 53. The stem 57 extends through a vertical hole 59 in the block and through a coincident hole 61 in the housing 11. A nut 63 is provided on the inside of the housing 11 to secure the stem 57 and plate 55.

As the nut 63 is tightened the rubber block 53 is squeezed outwards pressing against the front face 65 of the lens 10. The lens 10 is firmly secured by the horizontal expansion produced by squeezing the rubber block 53. The effect of the horizontal expansion is facilitated by the slight non-vertical slope of the front face 65. The front face 65 is tilted upwards and inwards slightly. Inserting the rubber block 53 into the gap 51 induces a wedging action against the tilted front face 65 and forces the lens into position.

The mounting surfaces on the lens 10, namely the upper portion of the entrance face 15, the horizontal plateau 35, the bottom surface 39, and the front face 65, are all mechanically cushioned in the housing 11. Further, these surfaces are peripheral to the light path through the lens 10 and do not interfere therewith. These surfaces are flush and natural to the lens 10 and therefore require no extra steps during the manufacturing process.

It will be apparent to those skilled in the art that the objects of the present invention have been achieved by providing a shallow lens and light source optical system. The nature of the optical surfaces allow a straightforward optical analysis, and a relatively problem-free manufacturing process. The contour of the lens aids in mounting and sealing the lens with the housing.

Although this invention has been described with respect to a particular embodiment thereof, it is not to be so limited as changes and modifications may be made therein which are within the intended scope of the invention.

I claim as my invention:

1. A shallow optical system adapted to be horizontally mounted, said optical system comprising:
   a refracting lens having a focal point located laterally rearward of and slightly below said lens;
   a light source positioned proximate said focal point for providing a diverging light beam;
   a light entrance face rearwardly and downwardly disposed at the rearward end of said lens and disposed toward said light source, said entrance face having substantially the contour of a portion of a hyperboloid of revolution about an axis which contains said focal point and which is displaced from the horizontal, said axis of revolution tilted upwards and towards the center of said lens, said entrance face refracting the portion of said diverging light beam which strikes thereon into a substantially parallel beam of light which is substantially parallel to said axis of revolution; and
   a flat light exit face forwardly and upwardly disposed on the forward end of said lens, said light exit face sloping upwards and towards the center of said lens, the perpendicular to the plane of said light exit face being angularly displaced further from the horizontal than said axis of revolution, and said exit face refracting said parallel beam into a horizontal light beam.

2. The optical system as specified in claim 1, wherein said lens has a top ridge, the forward face of said top ridge being integral and coplanar with said light exit face forming an upper extension thereto, the rear face of said top ridge sloping downwards and to the rear of said lens.

3. The optical system as specified in claim 1, wherein the sides of said lens taper inwards from the center towards the front and toward the rear.

4. The optical system as specified in claim 1, wherein the sides of said lens slope upwards and outwards.

5. A shallow optical system adapted to be horizontally mounted, said optical system comprising;
   a refracting lens having a focal point located laterally rearward of and slightly below said lens;
   a horizontally disposed elongated light source which has a filament positioned substantially at said focal point for providing a light beam diverging toward said lens;

a light entrance face rearwardly downwardly disposed at the rearward end of said lens and disposed toward said light source, said entrance face having substantially the contour of a hyperboloid of revolution about an axis which contains said focal point and which is displaced from the horizontal, said axis of revolution tilted upwards and towards the center of said lens and contained in a vertical plane which divides said lens, said entrance face refracting the portion of said diverging light beam which strikes thereon into a parallel beam of light which is parallel to said axis of revolution and;

a flat light exit face forwardly and upwardly disposed on the forward end of said lens, said light exit face sloping upwards and towards the center of said lens, the perpendicular to the plane of said light exit face being angularly displaced further from the horizontal than said axis of revolution and parallel to said vertical plane, said exit face refracting said parallel beam into a horizontal light beam.

6. The optical system as specified in claim 5, wherein said lens has a top ridge, the forward face of said top ridge being integral and coplanar with said light exit face forming an upper extension thereto, the rear face of said top ridge sloping downwards and to the rear of said lens, and a generally vertical front mounting surface is provided at the forward end of said lens.

7. The optical system as specified in claim 5, wherein the sides of said lens taper from the center towards the front and towards the rear.

8. The optical system as specified in claim 5, wherein the sides of said lens slope upwards and outwards.

9. A shallow horizontal orientated optical system comprising:

a refracting lens having a focal point located laterally rearward of and slightly below said lens;

a horizontally disposed elongated light source which has a filament positioned substantially at said focal point for providing a light beam diverging toward said lens;

a light entrance face rearwardly downwardly disposed at the rearward end of said lens, said entrance face having substantially the contour of a hyperboloid of revolution about an axis which contains said focal point and which is displaced from the horizontal, said axis of revolution tilted upwards and towards the center of said lens and contained in a vertical plane which divides said lens, said entrance face refracting the portion of said diverging light beam which strikes thereon into a parallel beam of light which is parallel to said axis of revolution; and a flat polished light exit face forwardly and upwardly disposed on the forward end of said lens, said light exit face sloping upwards and towards the center of said lens, the perpendicular to the plane of said light exit face being angularly displaced further from the horizontal than said axis of revolution and parallel to said vertical plane, said exit face refracting said parallel beam into a horizontal light beam.

10. The optical system as specified in claim 9, wherein said lens has an inverted V-shaped top ridge, the forward face of said top ridge being integral and coplanar with said light exit face forming an upper extension thereto, the rear face of said top ridge sloping downwards and to the rear of said lens, and a generally vertical front mounting surface provided at the forward end of said lens.

11. The optical system as specified in claim 9, wherein the sides of said lens taper from the center towards the front and towards the rear.

12. The optical system as specified in claim 9, wherein the sides of said lens slope upwards and outwards.

13. A shallow light source adapted to be horizontally mounted, said light source comprising:

a shallow housing having a radial light exit trough provided in the top surface thereof, and a window provided through said housing proximate the inwardly extending extremity of said trough;

a light-transmitting lens having a predetermined index of refraction, said lens secured in the window provided in said housing;

an interiorly disposed light-entrance face formed by the surface portion of said lens which extends inwardly and downwardly within said housing opposite the window provided in said housing, said light-entrance face having a surface of predetermined contour which approximates a surface of revolution which is formed about an axis and a focal point, the focal point of the surface which forms said light entrance face positioned laterally from said lens away from the window provided in said housing and slightly below said lens, the axis of revolution of the surface which forms said light-entrance face passing through said focal point and being tilted upwardly and passing generally through the center of said lens;

a light source positioned proximate the focal point of said light-entrance face, said light source operable to produce a diverging light beam;

a generally flat exteriorly disposed light exit face on said lens disposed at a predetermined angle, said light exit face positioned proximate the trough provided in said housing and on the opposite side of said lens from said housing and on the opposite side of said lens from said light source, said light exit face sloping upwardly and away from the light exit trough provided in said housing, and the perpendicular to said light exit face being angularly displaced a predetermined amount further from the horizontal than the axis of revolution of said light-entrance face; and the predetermined curvature of said light-entrance face and the predetermined index of refraction of said lens causing light from said light source upon striking and entering said light-entrance face to be refracted into a plurality of generally parallel light rays passing through said lens and at a predetermined angle with respect to said light-exit face, and the predetermined index of refraction of said lens and the predetermined angle at which said light exit face is disposed causing the generally parallel light rays passing through said lens to exit therefrom as a plurality of substantially horizontal light rays which pass through the trough provided in said housing.

14. A shallow light source adapted to be horizontally mounted, said light source comprising:

a shallow housing having a radial light exit trough provided in the top surface thereof, and a window provided through said housing proximate the inwardly extending extremity of said trough;

a light-transmitting lens having a predetermined index of refraction, said lens secured in the window provided in said housing;

an interiorly disposed light-entrance face formed by the surface portion of said lens which extends inwardly and downwardly within said housing opposite the aperture provided in said housing, said light-entrance face having a surface of predetermined contour which approximates a portion of the surface of a hyperboloid of revolution which is formed about an axis and a focal point, the focal point of the hyperboloid which forms said light entrance face positioned laterally from said lens away from the aperture provided in said housing and slightly below said lens, the axis of revolution of the hyperboloid which forms said light-entrance face passing through said focal point and being tilted upwardly and passing generally through the center of said lens;

a light source positioned proximate the focal point of said light-entrance face, said light source operable to produce a diverging light beam;

a generally flat exteriorly disposed light exit face on said lens disposed at a predetermined angle, said light exit face positioned proximate the trough provided in said housing and on the opposite side of said lens from said light source, said light exit face sloping upwardly and away from the light exit trough provided in said housing, and the perpendicular to said light exit face being displaced angularly a predetermined amount further from the horizontal than the axis of revolution of said light-entrance face; and the predetermined curvature of said light-entrance face and the predetermined index of refraction of said lens causing light from said light source upon striking and entering said light-entrance face to be refracted into a plurality of generally parallel light rays passing through said lens and at a predetermined angle with respect to said light-exit face, and the predetermined index of refraction of said lens and the predetermined angle at which said light exit face is disposed causing the generally parallel light rays passing through said lens to exit therefrom as a plurality of substantially horizontal light rays which pass through the trough provided in said housing.

15. A shallow light source adapted to be horizontally mounted, said light source comprising:

a shallow housing having two generally opposed and radial light exit troughs provided in the top surface thereof, said housing having two windows provided therein, one window proximate the inwardly extending extremity of each of said troughs;

two light-transmitting lenses having a predetermined index of refraction, one of said lenses secured in each of said windows provided in said housing;

a light-entrance face formed by the surface portion of each of said lenses which extends inwardly and downwardly within said housing opposite the associated window provided in said housing, each of said light-entrance faces having a surface of predetermined contour which approximates a portion of a hyperboloid of revolution which is formed about an axis and a focal point, the focal points of the hyperboloids which form said light entrance faces being substantially the same point and positioned between and slightly below said lenses, the axis of revolution of the hyperboloids which forms said light-entrance faces passing through said focal point and being tilted upwardly and passing generally through the center of the associated lens;

a light source positioned proximate the focal points of said light-entrance faces, said light source operable to produce a diverging light beam;

a generally flat exteriorly disposed light exit face on each of said lenses disposed at a predetermined angle, said light exit faces positioned proximate the associated trough provided in said housing and on the opposite side of the associated lens from said light source, said light exit faces sloping upwardly and away from the corresponding light exit trough provided in said housing, and the perpendicular to each of said light exit faces being displaced angularly a predetermined amount further from the horizontal than the corresponding hyperboloid axis of revolution which in part defines the predetermined curvature of said light-entrance faces; and the predetermined curvature of said light-entrance faces and the predetermined index of refraction of said lenses causing light from said light source upon striking and entering said light-entrance faces to be refracted into a plurality of generally parallel light rays passing through said lenses and at a predetermined angle with respect to said light-exit faces, and the predetermined index of refraction of said lenses and the predetermined angle at which said light exit faces are disposed causing the generally parallel light rays passing through said lenses to exit therefrom as a plurality of substantially horizontal light rays which pass through the troughs provided in said housing.

References Cited

UNITED STATES PATENTS 3,250,906   5/1966   Loch _____ 240—1.2

FOREIGN PATENTS 942,296   11/1963   Great Britain.

NORTON ANSHER, *Primary Examiner.*

D. L. JACOBSON, *Assistant Examiner.*